Jan. 27, 1959  E. M. ZINKE  2,871,054
SUCTION CUP
Filed July 5, 1956
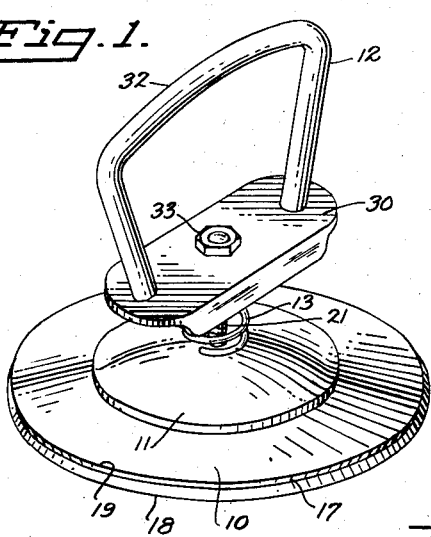
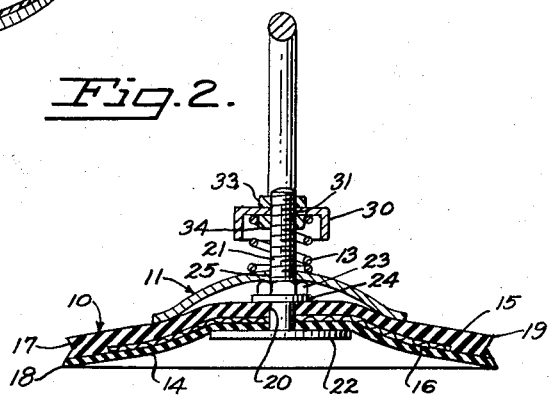
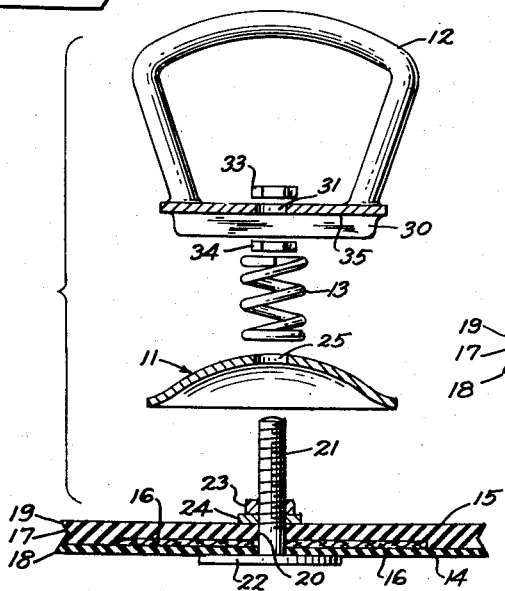
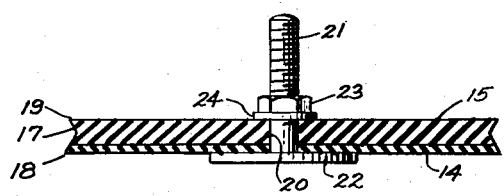
INVENTOR.
ERWIN MAX ZINKE
BY
ATTORNEY

United States Patent Office 2,871,054
Patented Jan. 27, 1959

2,871,054

SUCTION CUP

Erwin Max Zinke, Sonoma, Calif.

Application July 5, 1956, Serial No. 595,915

8 Claims. (Cl. 294—64)

This invention relates to an improved suction cup apparatus.

Heretofore, suction cups have been untrustworthy and have tended to break suction too easily, especially when an attempt is made to hold or lift relatively heavy loads with such cups. For example, no such cup has heretofore been known which is capable of pulling out a dent from a fender. Whereas theoretically it is often possible, when the dent is relatively smooth and board, still the suction cups in use heretofore have not been able to seize the curved surface nor to hold on to it after exertion of a force sufficient to pull the dent out. The present invention has solved this problem, and one of its objects is to provide a suction cup apparatus which can be used to pull many dents out of fenders as well as for other uses.

Another object is to provide a suction cup that can be used for lifting relatively heavy objects, whether flat or curved, so long as the curve is not too abrupt.

Another object of the inveniton is to provide a suction cup that will automatically seize a surface.

Another object is to provide a suction cup capable of use with large forces without having to use a suction pump to initiate or maintain the vacuum.

Another object is to provide a suction cup that will hold on to a surface so long as the force is normal to the surface, but will be released therefrom readily by lifting one edge and provided with means that aid in lifting an edge.

The invention which achieves these and other objects and advantages includes a composite disc having a lower contact layer of soft rubber and a heavier upper reinforcing layer of harder rubber. The disc is normally flat, but is backed up by a concave metal cup substantially narrower in diameter than the disc. An axially extendnig member projects from the rear or upper side of said disc and extends through the concave metal cup to an anchor or handle member, and a spring is provided to exert pressure between the handle and the metal cup, thereby urging the disc into a concave shape, and providing, in a manner to be explained, for seizure by the cupped rubber of a surface against which it is forced.

Other features of the invention, along with additional objects and advantages, will appear from the following description of a preferred embodiment thereof, presented in accordance with 35 U. S. C. 112.

In the drawings:

Fig. 1 is a view in perspective of a suction cup device embodying the principles of the invention.

Fig. 2 is a view in elevation and in section of the device of Fig. 1, and

Fig. 3 is an exploded view in elevation and partly in section of the device of Figs. 1 and 2, with the handle turned 90° with respect to Fig. 2.

Fig. 4 is a view in elevation and in section of a modified form of rubber disc assembly.

The principal elements of the device are a rubber disc 10, a metal cup 11, a handle 12, and a spring 13. The rubber disc 10 has two thicknesses, each of a different type of rubber: a lower disc 14 of soft rubber, such as pure gum rubber, and an upper disc 15 of harder rubber, the two discs being cemented or, preferably, vulcanized together. To increase the tear strength, I prefer, on those discs that are to have more rugged use, to cement a thin disc 16 of strong woven cloth between the discs 14 and 15 as shown in Figs. 2 and 3. However, for less strenuous duty, the structure shown in Fig. 4, where the discs are vulcanized together without any reinforcement, is satisfactory. The soft rubber of the lower disc 14 provides an excellent sealing action, due in part to its resiliency, while the harder disc 15 above it backs it up and gives it much more strength and an ability to hold on to any suction that has been created as against a pull normal to the surface engaged.

Preferably, the composite disc 10 has a circular outer periphery 17 that, when seen in cross section, has the appearance of a V set on its side. This provides a feather edge 18 for better sealing and a reverse sloped portion 19 affording a place to catch hold of the periphery 17 and lift it up when it is desired to break the vacuum and remove the cup.

The disc 10 is provided with a central opening 20 through which passes a bolt 21 having a thin flat head 22 of relatively wide area to engage the lower surface of the disc 10. This bolt 21 is clamped to the disc 10 by means of a nut 23 and washer 24 on the upper surface of the disc 10. Obviously, the fit should be not only smooth but air tight, and this feature is obtained by exerting pressure to sink the broad flat head 22 into the soft rubber 14. The resistance to tear provided by the cloth disc 16 resists the pull of the head 22 and washer 24 in the stronger construction of Figs. 1–3.

Over this assembly is placed the concave metal cup 11. It will be noted that the cup 11 has a substantially smaller radius than the disc 10 and that its concavity is approximately that desired at the center of the suction disc 10 with enough space being provided for seating the washer and nut 24, 23. The stem of the bolt 21 extends out through an opening 25 in the metal cup 11 and a substantial distance therebeyond where it is secured to the anchor or handle member 12.

The handle 12 may comprise a short metal channel 30 having an opening 31 therethrough and a closed handle portion 32 welded or otherwise secured to either end. The opening 31 need not be threaded, and the bolt 21 may be secured to the handle by means of a pair of nuts 33, 34, one on either side of the opening 31 and abutting the flat central portion 35 of the channel 30. The sides of the channel will hold the nut 34, which are preferably square or hexagonal, against turning, and makes it quite simple to tighten the upper nut 33 and hold it in place. The upper nut 33 may then be tightened by a wrench.

Before the bolt 21 is inserted into the handle 12, the spring 13 may be placed around the end of the suction cup 11, later to be seated against the lower surface of the central channel portion 35. The nuts 33, 34 are so located that the spring 13 will be compressed a substantial amount between the handle 12 and the metal cup 11. This insures the cupping action of the cup 11 on the rubber disc 10 and also makes it possible to obtain suction and seizure quickly and automatically.

The completed assembly holds the rubber disc 10 cupped, as shown in Fig. 2, and with the head 22 of the bolt 21 sunk into the soft rubber 14 so that it is air tight. All that need be done when operating the device is to push it on to the surface to be engaged, preferably with a smart force. The spring 13 is compressed momentarily to permit some flattening of the disc 10, but immediately springs out to re-form the disc 10 to its concave shape, creating suction against the surface contacted. It is very difficult, practically impossible by hand, to pull the disc 10 off the surface by pull normal to the surface once good contact has been made, but the contact can be easily broken by simply placing a finger-tip against the peripheral portion 19 and lifting a part of the edge 19 off the surface. Then, the vacuum being broken, the device can be lifted away by its handle 12.

As stated heretofore, the pressure is sufficient to straighten regular concavities in fenders of the type where there has been no creasing of the metal. It is also quite sufficient for lifting and carrying objects as well as for other applications where strong readily applied suction force is desirable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a suction device, the combination of a normally flat composite rubber disc having a thick upper reinforcing portion made of relatively hard rubber and a thinner lower surface-engaging portion made of relatively soft rubber; a concave metal cup smaller in diameter than said disc in which the central portion of the disc lies, with the upper portion against said cup; a bolt having a thin, broad head sunk into the soft rubber lower disc portion and a stem extending through said disc and said cup and beyond said cup for a substantial distance; a nut threaded on said stem and against said hard rubber portion to secure said rubber disc to said bolt; a handle secured to said bolt; and a spring compressed between said metal cup and said handle, whereby said spring enables seizure of an object by said device when said device is applied onto said object by pressure and the pressure then released, the soft rubber portion assuring good surface contact and the hard rubber portion reinforcing and supporting the soft rubber portion.

2. The combination of claim 1, wherein the composite rubber disc is reinforced against tear by a circular piece of cloth between the upper and lower disc portions, the diameter of said cloth piece being smaller than that of the disc so as not to affect the flexibility of the edges thereof.

3. The combination of claim 1 wherein the disc has a peripheral generally axial surface generally V-shaped as seen in section, to provide a feather edge at the lower surface of the lower disc portion and an inclined ledge on the upper surface of the upper disc portion that can be engaged for lifting a peripheral portion so as to break a vacuum inside.

4. In a suction device, the combination of a composite normally flat rubber disc, the upper portion of the disc made of harder rubber than the lower portion; a concave metal cup smaller in diameter than said disc, with an outer rim of its concave surface in engagement with the upper portion of said disc; a fastening member having a thin, broad head sunk into the soft lower rubber disc portion and a shank extending through the center of said disc and said cup and therebeyond; means threaded on said shank and against the upper portion of said disc to secure said disc to said fastening member; a handle member secured to said shank; and a coil spring around said shank under compression between said metal disc and said handle.

5. The combination of claim 4 in which said handle comprises a channelled base and a handhold ring portion secured to said base, said base having its channel facing said cup and adapted to contain the upper end of the spring and a lower nut threaded on said fastening member, while the upper face of the base has an upper nut threaded on said fastening member.

6. A suction cup assembly, comprising a flexible disc having a portion of relatively hard rubber bonded to a portion of relatively soft rubber, with a cloth member in between, the diameter of said cloth member being smaller than that of said disc so as not to affect the flexibility of the edges thereof; a concave, smaller diameter, metal cup having its concave surface overlying the central part of said hard rubber portion with a rim portion of said concave surface in contact with said hard rubber portion; a bolt having a head inserted engaging the soft rubber portion, a nut engaging the hard rubber portion and a stem extending up through said cup and therebeyond a nut threaded on said stem and engaging said hard rubber portion to secure said disc to said bolt; a rigid member secured adjacent the outer end of said bolt stem and a spring between said metal disc and said rigid member.

7. A suction cup comprising a normally flat rubber disc having a surface-engaging portion of soft rubber backed up by a reinforcing portion of harder rubber; a concave, smaller diameter, centrally apertured metal cup with a rim edge of its concave surface in contact with said hard rubber portion; bolt means secured centrally to said disc on both sides of said disc and extending through said cup; a handle secured to said bolt means and a spring compressed between said metal cup and said handle.

8. In a suction device, the combination of a composite normally flat rubber disc having an upper disc-shaped portion made of harder rubber than a lower disc-shaped portion and vulcanized thereto; a concave metal cup smaller in diameter than said disc in engagement with said upper portion; a bolt having a thin, broad head sunk into the soft lower rubber disc portion and bolted to the upper disc portion, with a shank extending through the center of said disc and the center of said cup and therebeyond; means threaded on said shank in engagement with the upper portion of said disc; a handle member secured to said bolt shank; and a spring under compression between said metal disc and said handle.

References Cited in the file of this patent

UNITED STATES PATENTS

| | | |
|---|---|---|
| 174,280 | Mooney | Feb. 29, 1876 |
| 1,152,981 | Schacht | Sept. 7, 1915 |
| 2,311,525 | Ebbs | Feb. 16, 1943 |
| 2,341,621 | Johnson | Feb. 15, 1944 |
| 2,351,666 | Cohen | June 20, 1944 |
| 2,370,938 | Cohen | Mar. 6, 1945 |